United States Patent [19]

Montalcini et al.

[11] Patent Number: 5,019,993

[45] Date of Patent: May 28, 1991

[54] MACHINE FOR MEASURING AND MATHEMATICALLY DEFINING THE SURFACE OF THREE-DIMENSIONAL MODELS, PARTICULARLY FOR THE MANUFACTURE OF MOLDS WITH NUMERIC-CONTROL MACHINE TOOLS

[75] Inventors: Piera L. Montalcini; Antonio Racciu, both of Turin, Italy

[73] Assignee: Advanced Data Processing Adp S.r.l., Turin, Italy

[21] Appl. No.: 261,301

[22] Filed: Oct. 24, 1988

[30] Foreign Application Priority Data

Oct. 26, 1987 [IT] Italy ............................ 53750/87[U]

[51] Int. Cl.$^5$ .......................... G06F 15/46; G01B 9/00
[52] U.S. Cl. ........................... 364/474.29; 364/474.03; 364/474.37; 364/560
[58] Field of Search ...................... 364/474.29, 474.03, 364/474.05, 474.37, 560-564; 382/65, 25; 356/375-380

[56] References Cited

U.S. PATENT DOCUMENTS

| | | | |
|---|---|---|---|
| 3,901,606 | 8/1975 | Watanabe et al. | 364/560 |
| 3,927,948 | 12/1975 | Cox et al. | 364/560 |
| 4,375,921 | 3/1983 | Morander | 364/560 |
| 4,688,184 | 8/1987 | Taniguti et al. | 364/560 |
| 4,742,464 | 5/1988 | Duret et al. | 364/474.05 |
| 4,752,964 | 6/1989 | Okada et al. | 364/474.05 |

Primary Examiner—Clark A. Jablon
Assistant Examiner—Jim Trammell
Attorney, Agent, or Firm—Guido Modiano; Albert Josif

[57] ABSTRACT

The machine for measuring and mathematically defining the surface of three-dimensional models comprises a robotized support having at least three degrees of freedom, provided with actuation motors and position transducers, to support and position, in any point of space and with any orientation, a laser distance device rigidly coupled to the support. An electronic control unit controls the movements of the robotized support according to electric signals arriving from the laser distance device and from the position transducers to keep the head at a preset distance from the surface and perpendicular thereto, and an electronic processing unit memorizes on a magnetic support numeric information corresponding to the coordinates of points on the surface (S) to be measured.

4 Claims, 3 Drawing Sheets

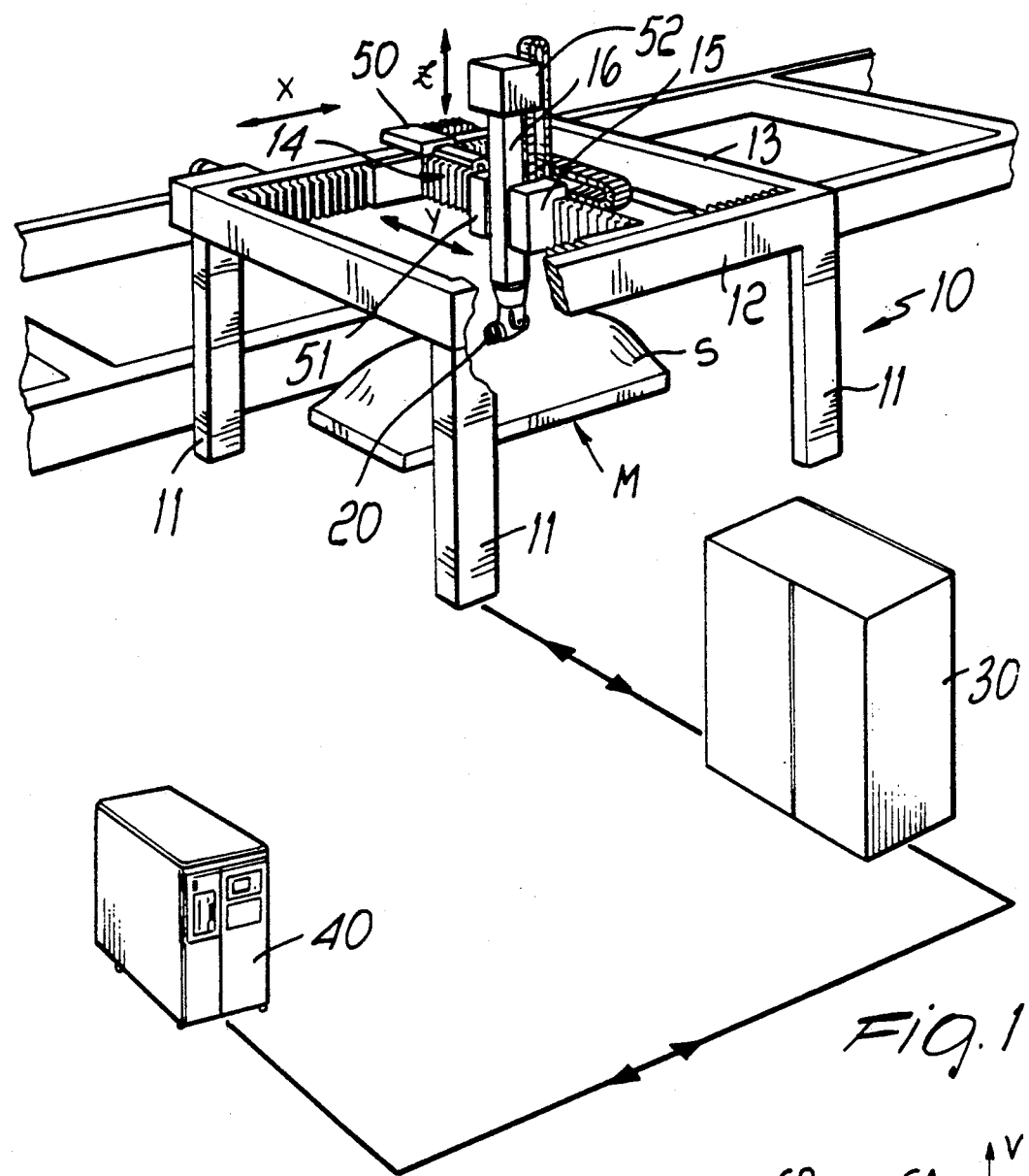
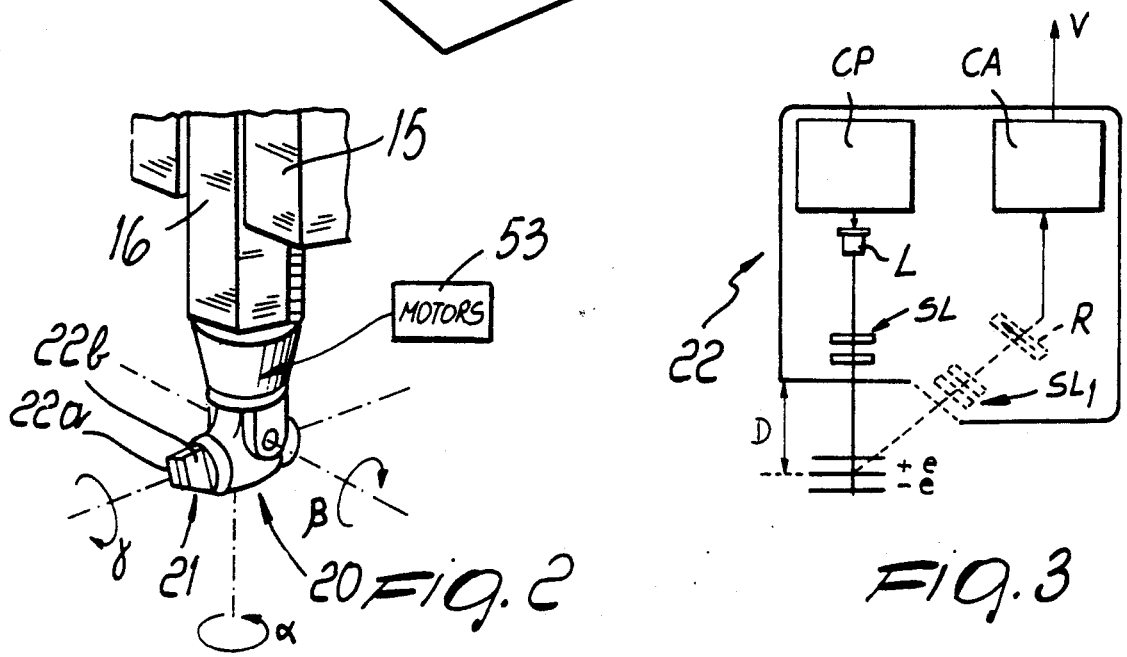
Fig.1
Fig.2
Fig.3

MACHINE FOR MEASURING AND MATHEMATICALLY DEFINING THE SURFACE OF THREE-DIMENSIONAL MODELS, PARTICULARLY FOR THE MANUFACTURE OF MOLDS WITH NUMERIC-CONTROL MACHINE TOOLS

BACKGROUND OF THE INVENTION

The present invention relates to a machine for measuring and mathematically defining the surface of three-dimensional models, particularly for the manufacture of molds by means of automated systems comprising numeric-control machine tools.

The preliminary execution of a three-dimensional model of the part or article to be reproduced in series with the subsequent molding process is fundamentally important for the design and manufacture of molds intended for the production of sheet-metal elements or plastic products for the car industry or for the manufacturing industry in general. The three-dimensional model—generally in soft material such as plasticine, polystyrene, wood, resin or the like—in fact allows to check the styling of the design and its accurate preliminary aerodynamic and/or structural testing where required, but it is most of all the starting point for the subsequent manufacture of the mold.

Devices for the three-dimensional measurement of models, capable of supplying an electronic processing system (so-called CAD-CAM systems) with the Cartersian coordinates of a set of points of the model's surface to obtain the so-called mathematical definition of the surface, have been recently produced for this purpose.

Currently known and employed measurement devices generally use mechanical surface feelers which, though they achieve their purpose, have hardly negligible disadvantages and limitations in use. These disadvantages and limitations are substantially constituted by the need to limit the scanning rate, i.e. the rate at which the feeler explores the surface, in order to ensure a correct feeler-surface contact; the structural complexity and therefore the cost of mechanical feelers; the possibility of jamming, and, the need to correlate the shape of the measurement feeler to that of the tool of the machine which generates the mold to reduce the complexity of the programs for processing the information transmitted by said feeler.

SUMMARY OF THE INVENTION

The aim of the present invention is to eliminate these disadvantages.

In particular, an important object of the present invention is to provide a machine for measuring the surfaces of three-dimensional models, capable of allowing a significant increase in the scanning rate of the points of the surface without affecting their correct measurment.

Another particular and important object of the present invention is to provide a machine capable of providing measurement data adapted to allow a significant simplification of the subsequent processing procedures intended to generate the control signals for the machine tool.

A further important object of the present invention is to provide a machine capable of correctly and rapidly measuring three-dimensional surfaces no matter how complicated their shape is, in particular having accentuated curvature variations and even very small connecting radii.

In order to achieve this aim, these important objects, and others which will become apparent from the following detailed description, the present invention relates to a machine for measuring and mathematically defining the surface of three-dimensional models, the essential characteristic whereof resides in the fact that it comprises, in combination, a robotized support with at least three degrees of freedom, provided with corresponding actuation motors and with position transducers, to support and position, in any point of space and with any orientation, a measuring head rigidly coupled to the support and constituted by a least one laser distance measurement device; an electronic control unit capable of controlling the movements of the robotized support according to electric signals arriving from the measuring head and from the position transducers, and an electronic processing unit capable of memorizing on a magnetic support numeric information corresponding at least to the coordinates of the points of the surface of the model to be measured.

According to an advantageous embodiment of the present invention, the robotized support is of the type having six degrees of freedom, defined by a set of three linear movements and by a set of three rotary movements, and the measuring head comprises a pair of laser distance measurement devices mounted side by side at a preset distance from one another, so that during the movement of the head on the surface of the model the two electric signals (preferably in terms of voltage) arriving from the distance measurement devices supply the control unit with the information related to the distance variations of the first and of the second measurement devices from the homologous points of the scanned surface. The control unit obtains from the electric signals proportional to the distance variations and from those arriving from the position transducers of the robotized support all the information required to control the motion of said support along the generic scanning path defined by the intersection of a plane with the surface to be measured; said information being constituted by the coordinates of the generic point P of the surface and by the components of the vector $\overline{W}$ normal to the surface at P with respect to a reference system rigidly associated with the base of the machine.

BRIEF DESCRIPTION OF THE DRAWINGS

Further purposes, characteristics and advantages of the present invention will become apparent from the following detailed description and with reference to the accompanying drawings, wherein:

FIG. 1 is a schematic perspective view of the machine and the related control system, FIG. 2 is an enlarged-scale detail view of FIG. 1, FIG. 3 is a functional block diagram of a known laser distance measurement device with which the measuring head of the machine of FIG. 1 is equipped.

DESCRIPTION OF THE PREFERRED EMBODIMENTS

Figure 1A:
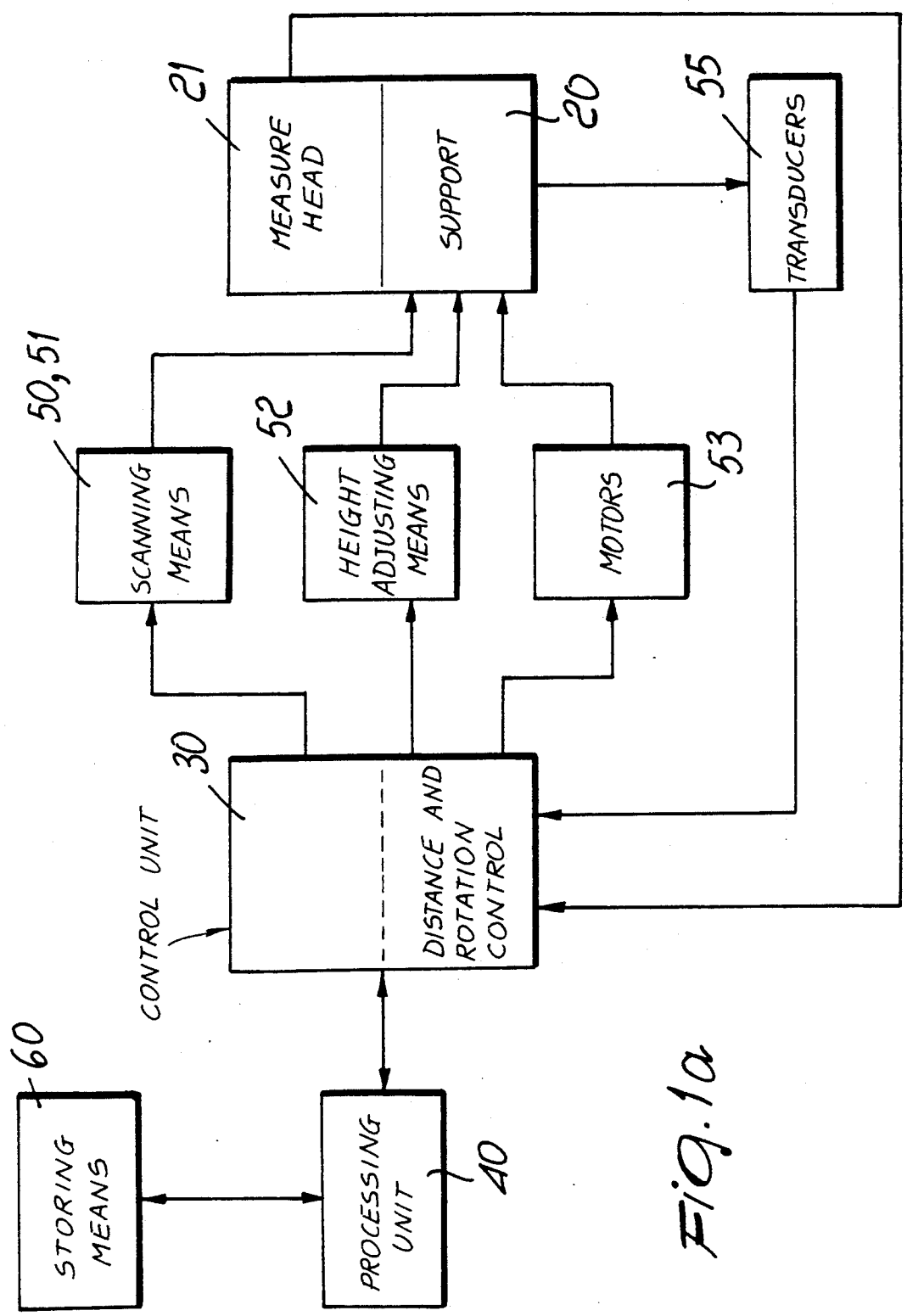
FIG. 1a is a schematic block diagram of the control system of this machine.

In FIG. 1, the reference numeral 10 indicates the machine according to the present invention, which comprises a known gate structure defined by uprights 11, side members 12 and crosspieces 13, arranged along a set of three Cartesian reference axes x, y and z.

The members 12 define guides for the retention and sliding of a movable crosspiece 14 actuated by an electric actuation motor so ( illustrated only schematically) which produces, by means of a known type of transmission, advantageously of the rack-and-pinion type, the translatory motion of the crosspiece in the direction of the axis x parallel to said members. The movable crosspiece 14 defines a retention and sliding guide for a slider 15 movable parallel to the crosspieces 13 in the direction of the axis y, which in turn supports a column 16 which is vertically movable in the direction of the axis z.

The slider 15 and the column 16 are also controlled by respective electric motors 51, 52 which, by means of known transmission, produce the translatory motions thereof in the respective directions of motion.

At the lower end of the column there is a support 20 capable of performing-by virtue of respective electric movement motors indicated schematically at 53 and defining rotating means—rotations $\alpha$, $\beta$, $\gamma$ about three mutally orthogonal axes. The support 20, termed "robotized" in the present description, is therefore of the type with six degree of freedom, being subject to three linear movements and to three rotary movements, all measurable by means of corresponding position transducers of a per se known type, shown only schematically at 55 in FIG. 1a.

A measuring head 21, intended to scan the three-dimensional surface S of the model M to be measured, is rigidly associated with the support 20.

According to the present invention, the measuring head 21 comprises at least one laser distance measurement device 22, the structure whereof—which is per se known—is illustrated in detail in FIG. 3. This measurement device, manufactured by RM Techniques De Pointe S. A., Corcelles-Le-Jorat, CH-1099, substantially comprises a control circuit CP, and LED L and a focusing lens system SL. The LED L emits a beam of infrared laser light which is focused onto the object (the model M) to be scanned by the lens system SL. The beam, reflected by object, is also subject to diffusion, and the diffused beam is refocused, by means of a second lens system SL1, onto a solid-state detector R. As the distance D of the object from the measurement device varies, the refocused beam strikes different regions of the detector R. An electronic amplifier circuit CA transduces this displacement into a voltage V proportional to the variation $\pm e$ of the distance D. The voltage V, together with the signals arriving from the position transducers 55 associated with the robotized support 20, is used by an electronic control unit 30 to produce electric signals adapted to actuate six electric motors for the movements of the robotized support 20 so as to keep the measuring head 21 at a constant distance from the surface S to be scanned. In practice, thus, the head 21 is moved along a scanning line in the plane X-Y by virtue of the action of motors 50, 51, defining scan movement means, and its height is controlled through motor 52, defining height adjusting means, so as to always keep head 21 at a preset constant distance from the surface S.

According to an advantageous embodiment of the present invention, two laser distance measurement devices 22a14 22b are used to supply the control unit 30 with a further item of information—constituted by the difference between the two output voltages Va−Vb—intended to also keep the head 21 orthogonal to the surface S to be measured.

For this purpose, the measurement devices 22a–22b rigidly coupled to the support 20 are arranged side by side at a preset mutual distance d.

Figure 4:
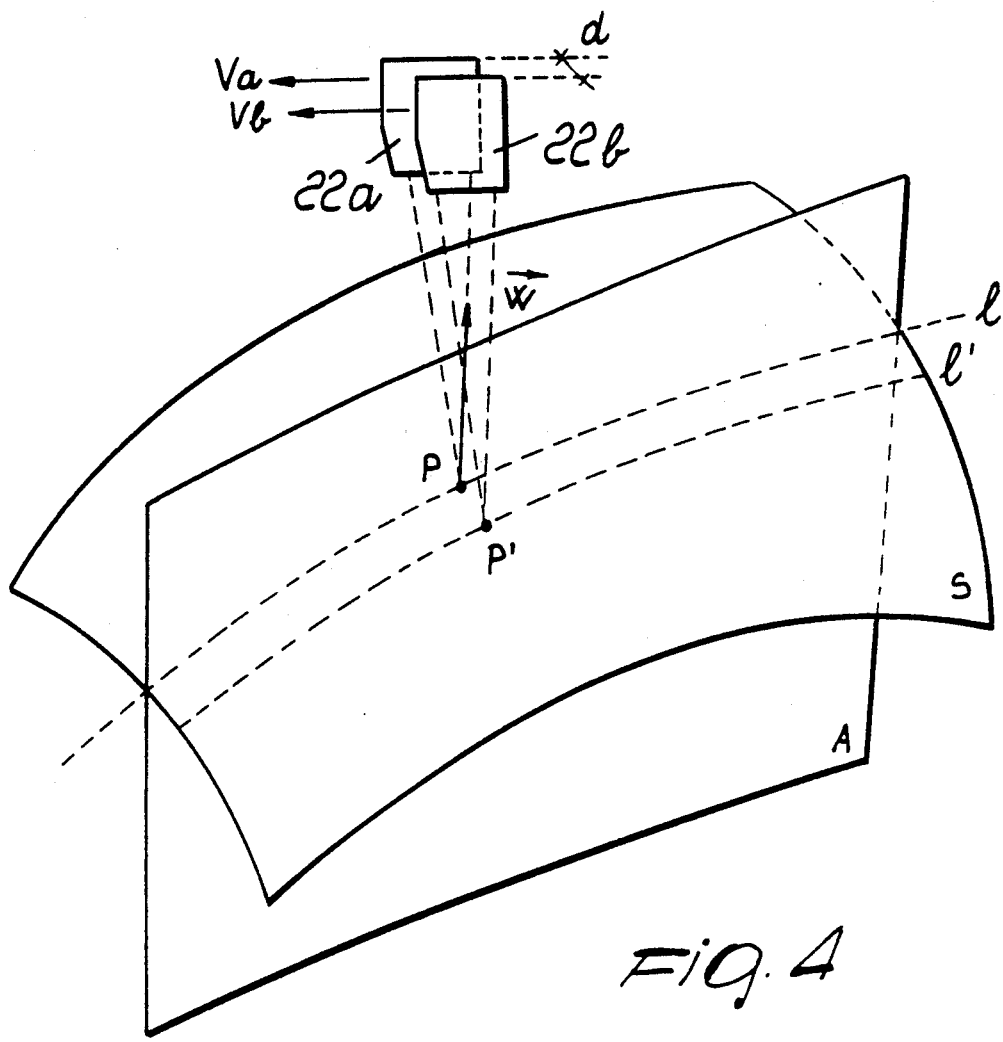
FIG. 4 is a diagram illustrating the method of operation of the measuring head with two distance measurement devices.

In this manner, as clearly shown in FIG. 4, the beam emitted by the measurement device 22a moves along the path 1, which is the locus of the points of intersection P of the surface S to be measured with a generic plane A; and the beam emitted by the measurement divice 22b moves along an adjacent path 1' which is the locus of the homologous points P'.

Figure 5:
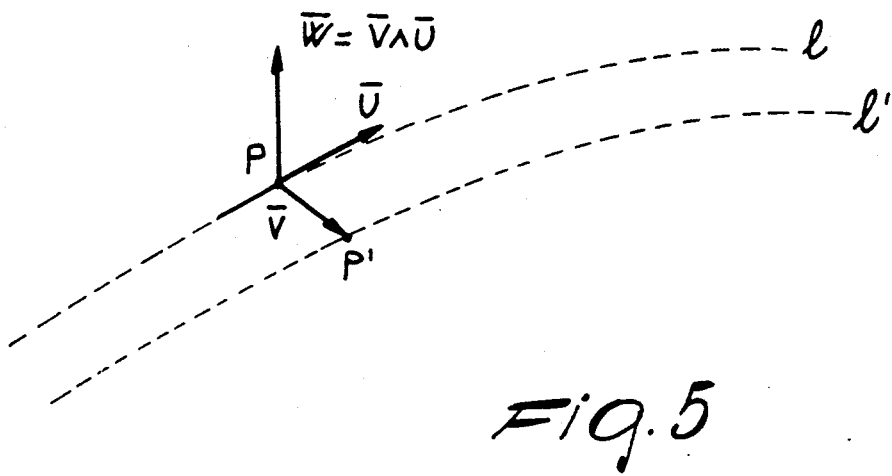
FIG. 5 is a vector diagram illustrating the determination of the vector normal to the surface to be measured in the generic point being considered.

This allows to measure the coordinates XP, YP and ZP of the generic point P of the path 1 and to calculate the components WX, WY and WZ of the vector $\overline{W}$ normal to the surface. In fact, as clearly shown in FIG. 5, the vector $\overline{W}$ is a result of the vector product $\overline{W} = \overline{V} \times \overline{U}$ between the vector $\overline{U}$ calculated from the points measured (self-acquired) along the path 1 and the vector $\overline{V}$ calculated from the homologous points P' measured (self-acquired) along the path 1' and resulting from the variation, within the margin $\pm e$, of the operating distance D of the measurement devices. In practice, the transducers 55 and the control unit 30 also define means for maintaining the measure head 21 perpendicular to the surface S.

An electronic processing unit 40 converts the information XP-YP-ZP and WX-WY-WZ into numeric values adapted to be stored on the magnetic support 60 of said unit to constitute the mathematical representation of the surface S of the model, from which, by means of successive and known processing, the information required to perform the numeric control of the machines which generate the mold is extracted.

We claim:

1. A machine for measuring and mathematically defining a three-dimensional surface, comprising, in combination:
    a supporting frame,
    a plurality of guides on said supporting frame,
    a robotized support movable along said guides,
    a measure head rigid with said robotized support, said measure head including head including light emitting means generating, at each instant, a beam of light directed toward and striking a three-dimensional surface at a reflection point to generate a reflected beam of light, light detecting means for detecting the reflected beam of light, and distance measuring means for measuring at each instant the distance between said measure head and the reflection point of the three-dimensional surface from the reflected beam of light,
    scan movement means for moving said measure head along a scanning line,
    height adjusting means for moving said measure head perpendicular to said scanning line,
    means for maintaining said measure head at a preset constant distance from the reflection point of the three-dimensional surface, said means for maintaining the preset constant distance being connected to said distance measuring means to receive therefrom the measured distance and correspondingly controlling said height adjusting means, rotating means for rotating said measure head, means for maintaining said measure head at each instant perpendicular to the three-dimensional surface at the reflection point, said means for maintaining the measure head perpendicular to the three-dimensional surface being connected to said measure head to receive the measured distance and comprising means for determining a vector normal to the three-dimensional surface at the reflection point, processing means for calculating the coordinates of the reflection points of the three-dimensional surface, and means for storing said coordinates, wherein said measure head comprises two laser measuring elements arranged side by side on said robotized support and rigid therewith for determining the vector normal to the three-dimensional surface, said laser measuring elements including each respective light emitting means and light detecting means for simultaneously scanning two parallel paths on the three dimensional surface as successions of homologous points, said machine further comprising means for processing the determined normal vector which are connected to said means for determining the normal vector, means for controlling said rotating means being provided which are connected to said means for processing the determined normal vector and which maintain said measure head at each instant perpendicular to the three-dimensional surface at the reflection point.

2. A machine according to claim 1, wherein said plurality of guides extend along three mutually perpendicular directions for allowing said robotized support and said measure head to move along three Cartesian axes and said rotating means controls rotation of said measure head about said three Cartesian axes, said means for maintaining the preset constant distance and the measure head perpendicular to the three-dimensional head including transducers controlling movement of said movable support and an electronic control unit.

3. A machine for measuring and mathematically defining a three-dimensional surface, comprising, in combination:

a supporting frame, a plurality of guides on said supporting frame, a robotized support movable along said guides, a measure head rigid with said robotized support, said measure head including light emitting means generating, at each instant, a beam of light directed toward and striking a three-dimensional surface at a reflection point to generate a reflected beam of light, light detecting means for detecting the reflected beam of light, and distance measuring means for measuring at each instant the distance between said measure head and the reflection point of the three-dimensional surface from the reflected beam of light, scan movement means for moving said measure head along a scanning line, height adjusting means for moving said measure head perpendicular to said scanning line, means for maintaining said measure head at a preset constant distance from the reflection point of the three-dimensional surface, said means for maintaining the preset constant distance being connected to said distance measuring means to receive therefrom the measured distance and correspondingly controlling said height adjusting means, rotating means for rotating said measure head, means for maintaining said measure head at each instant perpendicular to the three-dimensional surface at the reflection point, said means for maintaining the measure head perpendicular to the three-dimensional surface being connected to said measure head to receive the measured distance and comprising means for determining a vector normal to the three-dimensional surface at the reflection point, processing means for calculating the coordinates of the reflection points of the three-dimensional surface, and means for storing said coordinates, wherein said measure head comprises two laser measuring elements arranged side by side on said robotized support and rigid therewith for determining the vector normal to the three-dimensional surface, said laser measuring elements including each respective light emitting means and light detecting means for simultaneously scanning two parallel paths on the three dimensional surface as successions of homologous points, said means for determining the normal vector comprising means for calculating a first vector defined between said homologous points, said first vector being determined by a prefixed separation distance between said two laser measuring elements and by a calculated distance corresponding to the difference between the distance of each said laser measuring element from said three-dimensional surface, said means for determining the normal vector comprising means for calculating the cross vector product of said first vector and a second vector which is defined by scanned points along one of said parallel paths, said machine further comprising means for processing the determined normal vector which are connected to said means for determining the normal vector, means for controlling said rotating means being provided which are connected to said means for processing the determined normal vector and which maintain said measure head at each instant perpendicular to the three-dimensional surface at the reflection point.

4. A machine for measuring and mathematically defining a three-dimensional surface, comprising, in combination:

a supporting frame, a plurality of guides on said supporting frame, a robotized support movable along said guides, a measure head rigid with said robotized support, said measure head including light emitting means generating, at each instant, a beam of light directed toward and striking a three-dimensional surface at a reflection point to generate a reflected beam of light, light detecting means for detecting the reflected beam of light, and distance measuring means for measuring at each instant the distance between said measure head and the reflection point of the three-dimensional surface from the reflected beam of light, scan movement means for moving said measure head along a scanning line, height adjusting means for moving said measure head perpendicular to said scanning line, means for maintaining said measure head at a preset constant distance from the reflection point of the three-dimensional surface, said means for maintaining the preset constant distance being connected to said distance measuring means to receive therefrom the measured distance and correspondingly controlling said height adjusting means, rotating means for rotating said measure head, means for maintaining said measure head at each instant perpendicular to the three-dimensional surface at the reflection point, said means for maintaining the measure head perpendicular to the three-dimensional surface being connected to said measure head to receive the measured distance and comprising means for determining a vector normal to the three-dimensional surface at the reflection point, processing means for calculating the coordinates of the reflection points of the three-dimensional surface, and means for storing said coordinates, wherein said measure head comprises two laser measuring elements arranged side by side on said robotized support and rigid therewith for determining the vector normal to the three-dimensional surface, said laser measuring elements including each respective light emitting means and light detecting means for simultaneously scanning two parallel paths on the three dimensional surface as successions of homologous points, said means for determining the normal vector comprising means for calculating a first vector defined between said homologous points, said first vector being determined by a prefixed separation distance between said two laser measuring elements and by a calculated distance corresponding to the difference between the distance of each said laser measuring element from said three-dimensional surface, said means for determining the normal vector comprising means for calculating the cross vector product of said first vector and a second vector which is defined by scanned points along one of said parallel paths, said machine further comprising means for processing the determined normal vector which are connected to said means for determining the normal vector, means for controlling said rotating means being provided which are connected to said means for processing the determined normal vector and which maintain said measure head at each instant perpendicular to the three-dimensional surface at the reflection point, wherein said plurality of guides extending along three mutually perpendicular directions for allowing said robotized support and said measure head to move along three Cartesian axes and said rotating means controls rotation of said measure head about said three Cartesian axes, said means for maintaining the preset constant distance and the measure head perpendicular to the three-dimensional head including transducers controlling movement of said movable support and an electronic control unit.

* * * * *